Figure 1:
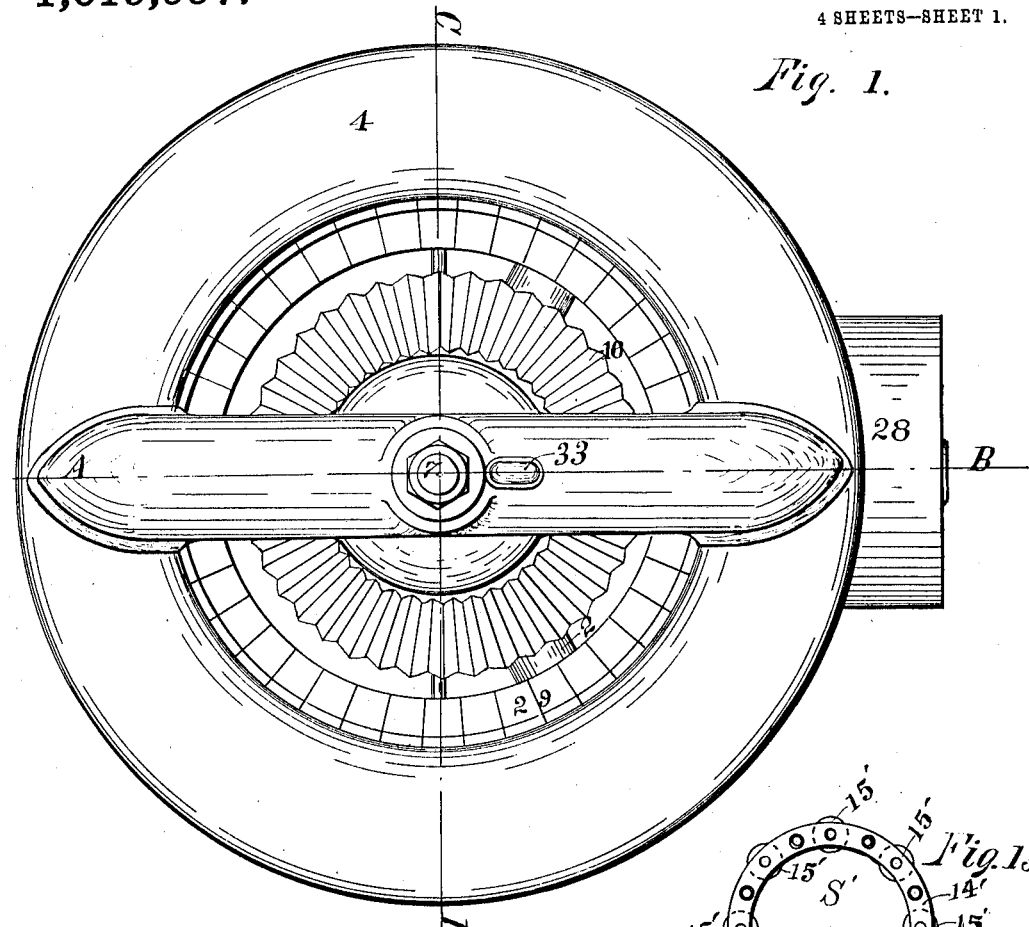

E. B. SYMONS.
STONE CRUSHING MACHINE.
APPLICATION FILED FEB. 26, 1904.

1,019,997.

Patented Mar. 12, 1912.
4 SHEETS—SHEET 1.

WITNESSES:
E. L. Beaver
J. E. Symons

INVENTOR
Edgar B. Symons

E. B. SYMONS.
STONE CRUSHING MACHINE.
APPLICATION FILED FEB. 26, 1904.

1,019,997.

Patented Mar. 12, 1912.
4 SHEETS—SHEET 2.

WITNESSES:
E. J. Beaver
J. E. Symons

INVENTOR
Edgar B. Symons

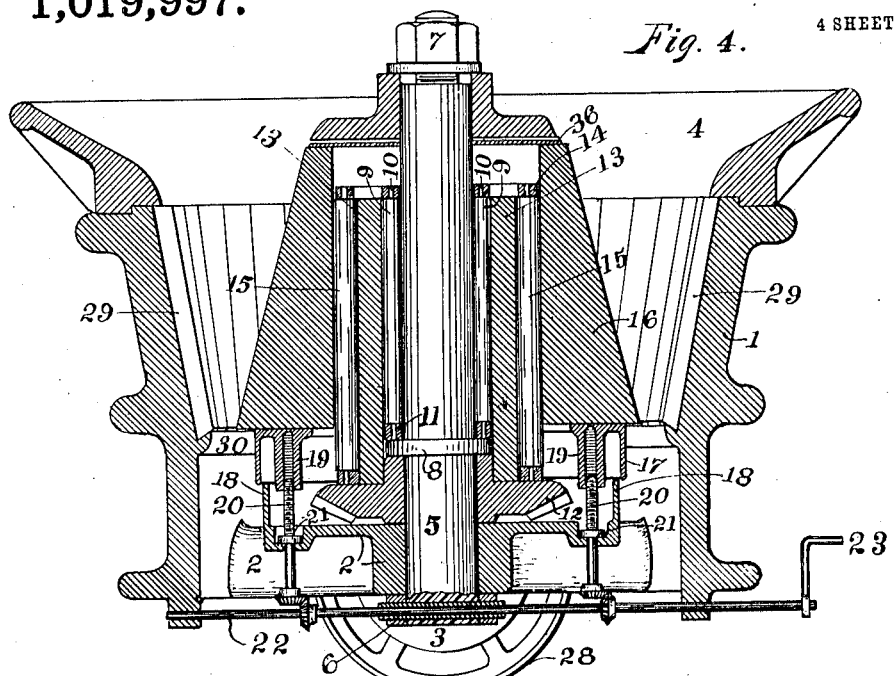
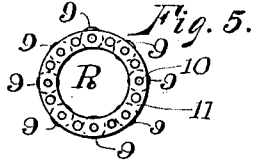
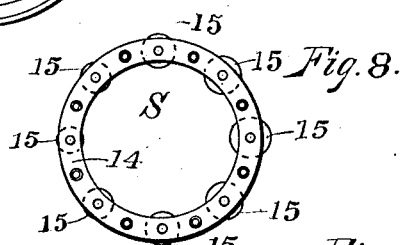
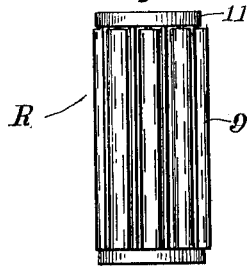
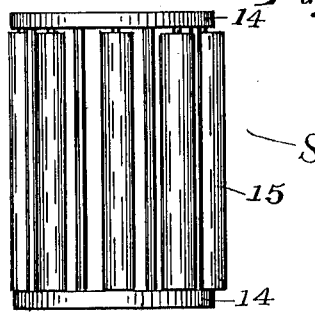

E. B. SYMONS.
STONE CRUSHING MACHINE.
APPLICATION FILED FEB. 26, 1904.

1,019,997.

Patented Mar. 12, 1912.

4 SHEETS—SHEET 4.

WITNESSES:

INVENTOR
Edgar B. Symons

UNITED STATES PATENT OFFICE.

EDGAR B. SYMONS, OF FORT WAYNE, INDIANA, ASSIGNOR, BY MESNE ASSIGNMENTS, TO SMITH AND POST COMPANY, OF MILWAUKEE, WISCONSIN, A CORPORATION OF WISCONSIN.

STONE-CRUSHING MACHINE.

1,019,997. Specification of Letters Patent. Patented Mar. 12, 1912.

Application filed February 26, 1904. Serial No. 195,459.

*To all whom it may concern:*

Be it known that I, EDGAR B. SYMONS, residing in Fort Wayne, in the county of Allen and State of Indiana, have invented a new and useful Stone-Crushing Machine, of which the following is a specification.

My invention relates to improvements in crushing-machines used in crushing rock, ores, shale, or other similar material.

A machine characterized by my invention comprises an outer shell or frame which supports by suitable connections a substantially centrally located shaft around which is mounted eccentrically a crushing-head. The crushing-head essentially comprises a sleeve-bearing around an eccentric having roller bearings to diminish friction. Two forms of my invention, which embody said characteristics, are herein shown and described. Other merely equivalent means for moving the crushing-head in the manner herein described, and characterized by the purposes stated, may be employed without departing either from the spirit or scope of my invention.

Figure 11:
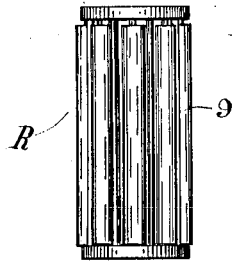
Figure 12:
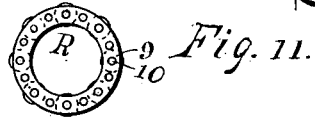
Figure 13:
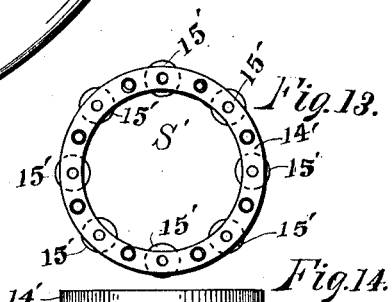
Figure 14:
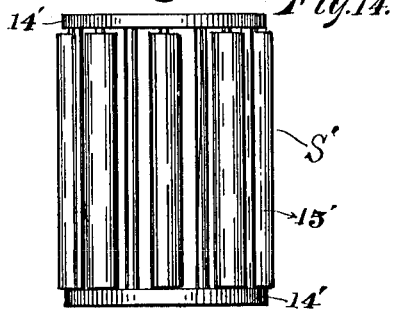
Figure 3:
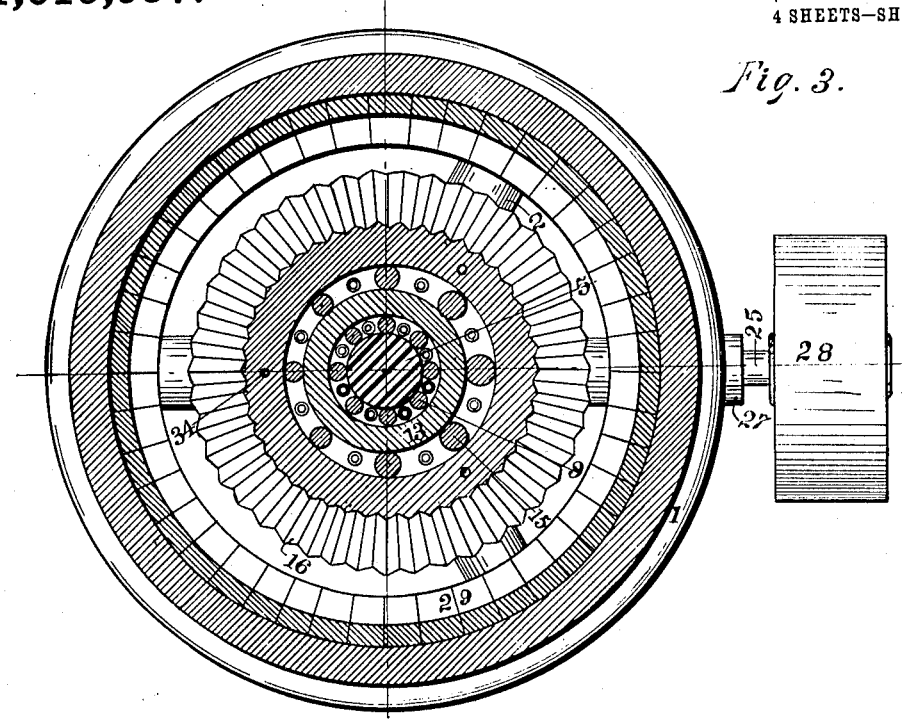
Figure 2:
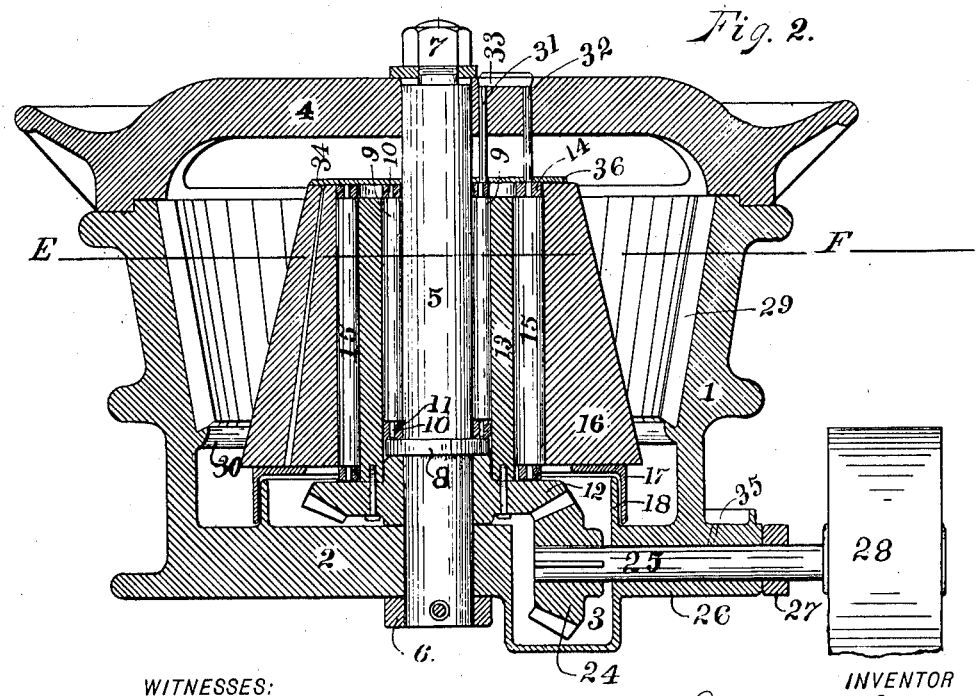
Figure 10:
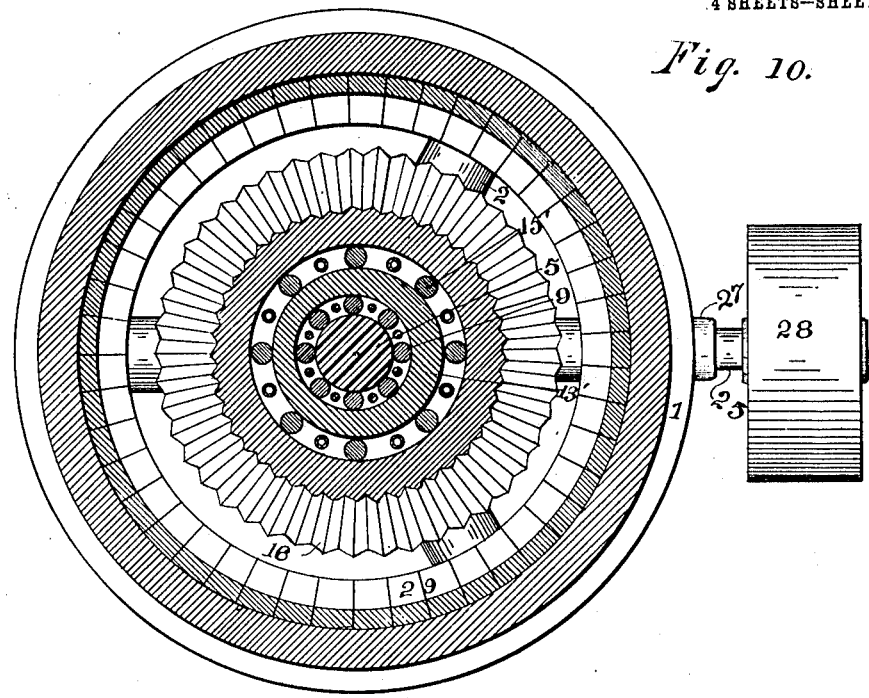
Figure 9:
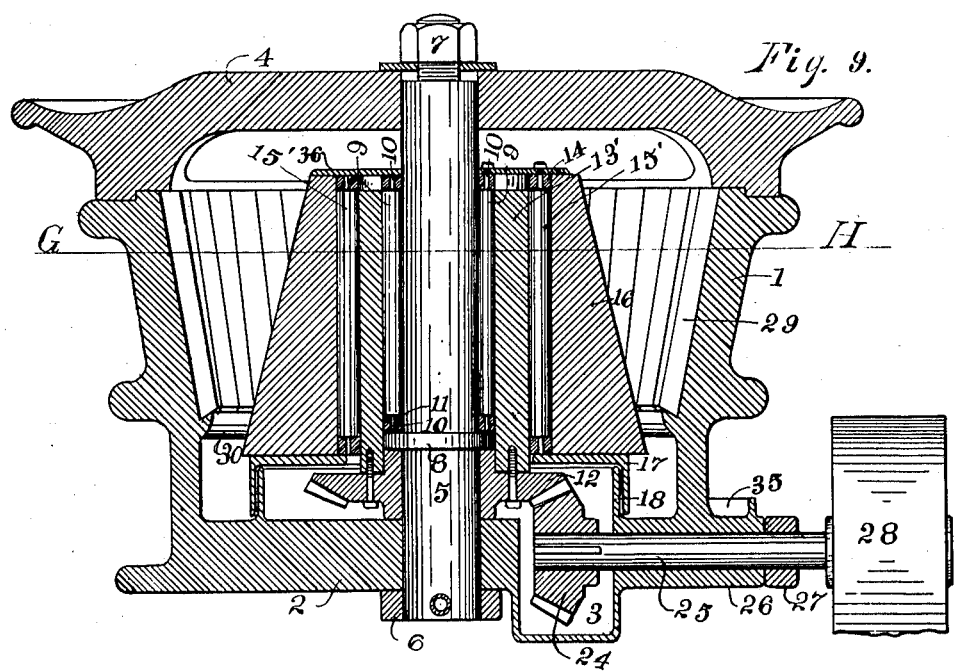

Prominent objects of my invention are 1st.—to improve the means of moving or gyrating the crushing-head whereby substantially the same transverse, or eccentric movement is given to every part of said crushing-head, which renders the work of the machine more effective; 2d.—to afford suitable roller bearings for receiving the working or crushing strain, thereby reducing friction and consequently lessening the power required for operation; 3d.—to improve the support and position of the driving gear and other connected means for the application of power; 4th.—to improve the means of regulating the size of the crushed product; 5th.—to make simple and adequate provisions for oiling the parts subjected to wear; 6th.—to effect a mechanically compact assemblage of all working parts, thus allowing in my machine the use of a comparatively short and light main frame or shell, which is convenient for portability or shipment; and 7th.—to afford an organized mechanism which can be manufactured with economy and which shall be durable and efficient. I attain these objects, and other apparent minor ones, by the mechanism, constituting my invention, herein shown and described in its preferred form, and also in another equivalent form, reference being had to the accompanying drawings in which:

Figure 1 is a plan view of my machine; and Figs. 2, 3, 4, 5, 6, 7, and 8 are illustrative of my machine in its preferred form. Fig. 2 is a sectional elevation taken on the line A, B, of Fig. 1. Fig. 3 is a sectional plan view of my machine taken on the line E F, Fig. 2. Fig. 4 is a sectional elevation taken on the line C D, Fig. 1. Fig. 5 is a detail plan view of the roller-collar, or sleeve, comprising rollers mounted in a frame, and constituting the roller bearing around the central shaft. Fig. 6 is a detail elevation of the roller-collar, shown in Fig. 5. Fig. 7 is a detail elevation of the eccentric roller-collar, comprising a frame having rollers of graded diameters mounted therein, and which are adapted to travel on the inner cylindrical surface of the crushing-head. Fig. 8 is a plan view of the eccentric roller-collar, shown in Fig. 7. Fig. 9 is a sectional elevation taken on the line A, B, Fig. 1, showing my invention, wherein the roller-bearing eccentric for moving the crushing-head is shown in another form. Fig. 10 is a sectional plan view taken on the line G H, of Fig. 9. Fig. 11 is a detail plan of the roller-collar traveling around the central shaft in the form of my invention shown in Figs. 9, and 10. Fig. 12 is a side elevation of the roller-collar, shown in Fig. 11. Fig. 13 is a detail plan of the roller-collar, comprising rollers of substantially equal diameters mounted in a frame and adapted to travel on the inner cylindrical surface of the crushing-head, in the form of my invention, shown in Figs. 9 and 10. Fig. 14 is a side elevation of the roller-collar, shown in Fig. 13.

Similar figures and letters relate to similar parts throughout the several views.

The outer-shell, or bowl-shaped main frame 1 having a spider-armed bottom 2, recessed at 3 to incase the driving-pinion, is preferably made of a single casting. The crown-piece 4 fitted, as shown to the top of frame 1, serves as a reserve hopper for receiving uncrushed stone, strengthens frame 1, and affords reciprocal support to the substantially vertical and main central shaft 5. The bottom 2, and the crown-piece 4 substantially comprise radially-armed end-heads to the bowl-shaped outer frame 1. Shaft 5, having the collar 6 fastened to it near its lower end, and being provided near its upper end with the threaded nut 7, affords a means of holding crown-piece 4 securely to place. Shaft 5 thus constitutes a strong tie-brace for the machine and affords an axis of gyration for certain moving parts, hereinafter described. 8 is a collar secured to shaft 5. Resting on collar 8 and surrounding said shaft after the manner of a roller-bearing is the collar of rollers, or roller-collar R, detailed in Figs. 5 and 6, (also shown in Figs. 11 and 12), and which comprises the rollers 9, 9 of substantially uniform size, said rollers being provided with end-bearings 10, 10, in the frame 11, which has a sliding bearing on collar 8. Immediately beneath collar 8, is the bevel gear-wheel 12, which is supported on the central or hub portion of the radially-armed bottom 2 of frame 1, and which has a bearing around shaft 5. The gear-wheel 12 is firmly secured to and turns the sleeve 13 which is fitted to contain the roller-collar R, and to be contained (see Fig. 3, showing preferred form) within the eccentric roller-collar S, detailed in Figs. 7 and 8.

The eccentric roller-collar S, comprises the circular frame 14, affording end bearings to the series of rollers 15, 15, of graded diameters. The largest one of said rollers is placed in said frame diametrically opposite the smallest one. Also, every one of said rollers 15, is so positioned in frame 14, as both substantially to maintain a longitudinal line of contact with the outer cylindrical surface of the sleeve 13, and to maintain a similar longitudinal line of contact with the inner cylindrical surface of the crushing-head 16. The eccentric roller-collar S, encircles, after the manner of a roller-bearing, the sleeve 13 and is, in turn, encircled by the inner cylindrical surface of the crushing-head 16. The crushing-head 16, having its outer surface suitably corrugated, is preferably made in the form of a truncated cone, and rests on the sliding bearing afforded by the adjusting angle-iron ring 17, which incloses and is held to place by the guide-ring 18, comprising a part of the bottom 2. The adjusting ring 17, is provided with threaded lugs or sleeves 19, into which engage the threaded adjusting rods 20, which support ring 17, and are provided with collars 21 and are supported in bearings in the spider-arm bottom 2, as shown. The adjusting rods 20 have near their lower ends miter gear connections with the shaft 22, which is suitably supported in bearings, provided in the bottom 2, of frame 1.

To the shaft 22 is attached the hand-crank 23. The bevel gear-wheel 12 is driven by the pinion 24 keyed to shaft 25 which is supported in the bearing 26, provided in the bottom 2 of frame 1. Shaft 25 is furnished with the collar 27, and has keyed thereto the belt-wheel 28. The concave dies 29, divided longitudinally into convenient removable sections are supported by the projecting beveled ring 30 comprising a part of frame 1. Said dies 29, receive the wear incident to crushing stone. 31 and 32 are oil-pipes for conducting oil from the oil-cup 33 to the rollers R, and S respectively. The rollers 9, 9, are brought in their travel successively beneath the lower exit of oil-pipe 31 and the rollers 15, 15 are brought successively in similar manner beneath the exit of oil-pipe 32. The overflow of oil from the upper bearings of said rollers finds its way by gravity to the lower bearings of said rollers in their respective frames, and also lubricates the bottom supports or sliding bearings afforded to said roller-frames as described. From thence the over-flow of oil passes into the recess 3 incasing the pinion 24.

By means of oil channels 34 cored through the crushing-head 16 the upper surface of the adjusting ring 17, may be lubricated. 33 is an oil-cup for the bearing 26. 36 is a removable dust-plate for the protection of the interior working parts and rests on crushing-head 16.

In the form of my invention shown in Figs. 9 and 10 and further illustrated by detail Figs. 11, 12, 13, and 14, an eccentric sleeve 13' is provided with a roller-collar S' in which the rollers are of substantially uniform size. The combination of the eccentric sleeve 13' with the roller-collar S' constitutes practically an equivalent for the sleeve 13 surrounded by the eccentric roller-collar S, as illustrated in the preferred form of my invention.

In the operation of my machine, stone or ore may be fed between the two arms of crown-piece 4 into the circular crushing-hopper afforded by the concave dies 29 and the crushing-head 16. Power having been applied to belt-wheel 28 the sleeve 13 is forced by wheels 12 and 24 to turn around the roller bearing afforded by the roller-collar R, and consequently to revolve around shaft 5. The contact of the rollers 15, 15 with the outer surface of the sleeve 13 causes the eccentric roller-collar S to follow said sleeve in its travel around central shaft 5, said collar S performing substantially half the number of revolutions made by said sleeve. The rollers 15, 15 also sustain a substantially continuous rolling contact with the inner cylindrical surface of the crushing-head 16. Consequently the crushing-head 16, which does not normally revolve about shaft 5, is forced in every part successively to approach and recede from the correspondingly opposite portion of the concave dies 29, in order to accommodate the changing position of the eccentric roller-collar S. Or, in other words, the crushing-head 16 is forced by the eccentric roller-collar S to perform a movement similar to that of an ordinary crank-sleeve having its bearing on a common eccentric shaft. In the movement described the crushing-head slides upon the supporting adjusting ring 17, and the surfaces subject to this sliding contact are made smooth and lubricated. It is evident that every part of the space within said circular crushing-hopper is in turn alternately enlarged and contracted through the described movement of said crushing-head, which consequently operates to crush stone or ore fed into said circular crushing-hopper, until the crushed product is reduced to sizes which permit it to fall through the opening at the bottom of said crushing-hopper, from whence said product may fall through a funnel-shaped chute on to the ground or into an elevator arranged and driven in any convenient manner.

The operator may decrease the size of the opening at the bottom of said crushing-hopper by raising the crushing-head 16 to the position shown in Fig. 4, through the use of the crank 23, which serves to raise the adjusting ring 17 by the means described; or the operator may increase the size of the opening at the bottom of the crushing-hopper by operating crank 23 to lower crushing-head 16 to the position preferred.

I desire to point out that the means herein shown and described give to each and every part of the crushing-head during the operation of my machine, approximately the same transverse movement. This affords to my machine great crushing capacity and renders it capable of taking hold of and crushing rock in the upper portion of its crushing-hopper more rapidly and readily than can be accomplished by those machines of a similar class in which the crushing-head is actuated by a swinging or gyrating lever-shaft, which limits the upper portion of the crushing-head to a less movement than that given to the bottom of the crushing-head.

It will be noted that the crushing strain exerted against the crushing-head is borne on roller bearings which have their central support in the shaft 5; further, that by removing the nut 7, the crown-piece 4, and the dust-plate 36 may be lifted off, thereby allowing the crushing-head and other interior parts to be taken out for repair, or replaced as may be desired.

Having thus described my invention, what I claim as new and desire to secure by Letters Patent, is:

1. In a crushing machine, the combination of an outer crushing shell having a spider arm bottom and a removable crown piece, a centrally located tie-shaft fixed to said bottom and crown piece, an eccentrically mounted crusher head movable on the shaft and means for operating said head.

2. In a crushing machine, the combination of an outer crushing shell with a crown piece fitted to said shell, a centrally located fixed shaft supported within such shell by bearings in the crown piece and in the shell, a collar of rollers surrounding said shaft as a roller bearing, a sleeve surrounding said rollers and a movable crusher head and means for operating said head.

3. In a crushing machine, the combination of a stationary crushing shell with a centrally located stationary shaft supported by suitable connections to said shell, a roller collar surrounding said shaft and comprising a series of rollers, a sleeve surrounding said roller collar, and means for turning said sleeve and a movable head and means containing said sleeve for operating said head.

4. In a crushing machine, the combination of a stationary outer crushing shell with a centrally located stationary shaft supported in such shell, a sleeve mounted on a roller bearing around said shaft, means for turning such sleeve, and a crushing head mounted on a roller collar comprising a series of rollers surrounding said sleeve.

5. In a crushing machine, the combination of a stationary outer crushing shell with a centrally located and substantially vertical stationary shaft held by connections to said shell, a sleeve mounted on a roller bearing around said shaft, a crushing head mounted on a roller bearing surrounding said sleeve, and means for turning said sleeve.

6. In a crushing machine, the combination of an outer crushing shell, provided at top and bottom with radial arms, with a centrally located shaft supported in said arms, a crushing head surrounding said shaft, and means intermediate this shaft and the head for causing said crushing head to vibrate eccentrically upon said shaft.

7. In a crushing machine, the combination of an outer crushing shell having a bowl-shaped interior surface with a crushing head suitably supported within said shell, a stationary shaft secured to the shell and passing through the crusher head, and means for moving all points in the body of said crushing head on substantially horizontal planes, substantially equal and like distances toward and away from the interior surface of said outer frame.

8. In a crushing machine, the combination of an outer crushing shell having radial armed end pieces and an interior bowl-shaped surface with a crushing head supported within said shell, said crushing head comprising a sleeve surrounding a series of rollers traveling around a fixed centrally located shaft supported by said end pieces, and means for moving said crushing head whereby the distance between the bowl and crushing head in each horizontal plane may be alternately enlarged and contracted.

9. In a crushing machine, the combination of a roller bearing comprising a series of rollers of graduated diameters, a rotating cylindrical device, a crusher head with an inner cylindrical surface, and a fixed crushing surface in connection with which the crusher head is adapted to operate, such roller bearing being interposed between the cylindrical device and the inner surface of the crusher head so as to travel substantially in contact with both such parts and cause a horizontal displacement of such crusher head.

10. In a crushing machine, a fixed cylindrical body and an eccentric roller collar surrounding and bearing upon it comprising a series of substantially parallel rollers of graduated diameters, and a frame in which the rollers are mounted.

11. In a crushing machine, the combination of an outer crushing shell having radial armed end pieces with a centrally located shaft supported by said end pieces, a roller collar surrounding said shaft, a sleeve surrounding said roller collar, a roller collar surrounding said sleeve, a crushing head surrounding said second collar, and means for turning said sleeve.

12. In a crushing machine, the combination of a hopper with interior crushing faces, a hollow crusher head adapted to oscillate in the discharge aperture of the hopper, an eccentric device containing anti-friction devices and placed within such crusher head to effect such oscillation means for operating said device and a supporting device for the crusher head vertically adjustable to vary the position of the head in the hopper.

13. In a crushing machine, the combination of a hopper with interior crushing faces, a vertical shaft axially positioned in the hopper, a hollow crusher head surrounding the shaft, and an eccentric device within the crusher head comprising a roller collar adapted to rotate about the shaft and to engage with such hollow crusher so as to effect substantially the same horizontal displacement of such crusher head throughout its length.

14. In a crushing machine, the combination of a hollow crusher head and shaft with a cylindrical device adapted to rotate eccentrically therein so as to impart an oscillating movement thereto, such device comprising two independent members one within the other, one of which consists of a roller collar, and means for imparting rotary motion to the inner of such members.

15. In a crushing machine, the combination of a stationary shaft, a hollow crusher head surrounding said shaft, and three rotatable devices within each other and all interposed between the shaft and such crusher head, one of said devices being eccentric to the other, and the inner and outer of such devices comprising a plurality of rollers, and rotating means associated with the middle device so as to oscillate the crusher.

16. In a crushing machine, the combination of a hollow crusher head having an exterior crushing surface, with a stationary crushing member, a stationary shaft and a cylindrical device mounted so as to rotate eccentrically on said shaft and located within said crushing head to impart an eccentric movement to the head.

17. In a crushing machine, the combination of a hollow crusher head, with a fixed shaft therefor, and an eccentric device interposed between said shaft and the crusher head adapted to give the latter oscillating movement substantially equal at all points along said crusher head.

18. In a crushing machine, the combination of a hopper having an interior crushing surface, with a hollow crusher head mounted to oscillate in such hopper in opposition to its crushing surface, a fixed shaft, and an eccentric device on said shaft, comprising anti-friction bearings, located within said head to effect such oscillating movement.

19. In a crushing machine, the combination of a hopper to receive the stone to be crushed with an interior crushing surface, a hollow crusher head mounted inside the hopper, and an eccentric device containing roller bearings located within and rotatable within and against said crusher head and a shaft within the crusher head and means for driving the eccentric device.

20. In a crushing machine, a stationary hopper, a crusher head therein, a revolving cylinder within said head, and an eccentric device composed of graduated rollers bearing between said head and the revolving cylinder whereby the revolutions of the cylinder are double the gyrations of the head.

21. In a crushing machine, the combination of a movable crushing body, a stationary member relative to which the movable body is gyrated, a driving device, and an eccentric device formed by a series of rollers of graduated diameters engaging by rolling friction with both the movable body and the driving means.

22. In a crushing machine, the combination of a driving device with a driven crushing body, and a power transmitting and velocity ratio reducing means consisting of an eccentric composed of graduated rollers engaging by rolling friction both the driving device and the driven body.

23. In a crushing machine, the combination of a stationary crusher head having apertured bottom and top pieces, with a stationary shaft connecting said bottom and top pieces, a crusher head within said shell, and an eccentric within the crusher head to gyrate the same, said eccentric abutting against such stationary shaft.

24. In a crushing machine, the combination of a crushing hopper with a crushing head therein, and a device within the head consisting of a fixed and rotatable part adapted to eccentrically move the head within the hopper.

25. In a crushing machine, the combination of a crushing head therein, an eccentric device and a stationary device in connection within the crushing head and substantially between the top and bottom of the hopper, and means for driving such eccentric device.

26. In a crushing machine, the combination of a hollow crusher head, with a fixed shaft therefor, and an eccentric device interposed between said shaft and the crusher head adapted to give the latter oscillating movement substantially equal at all points along said crusher head.

In testimony whereof I affix my signature, in presence of two witnesses.

EDGAR B. SYMONS.

Witnesses:
M. J. BLITZ,
J. E. SYMONS.